US 6,659,629 B2

(12) United States Patent
Potter et al.

(10) Patent No.: US 6,659,629 B2
(45) Date of Patent: Dec. 9, 2003

(54) RUNNING BOARD LIGHTING DEVICE

(75) Inventors: Brant James Potter, Farmington Hills, MI (US); Dianna Lynn Stadtherr, Livonia, MI (US)

(73) Assignee: North American Lighting, Inc., Farmington Hills, MI (US)

(*) Notice: Subject to any disclaimer, the term of this patent is extended or adjusted under 35 U.S.C. 154(b) by 18 days.

(21) Appl. No.: 09/753,421

(22) Filed: Jan. 3, 2001

(65) Prior Publication Data

US 2003/0189837 A1 Oct. 9, 2003

(51) Int. Cl.[7] .............................. B60Q 1/32; F21V 5/02
(52) U.S. Cl. ..................... 362/495; 362/331; 362/521
(58) Field of Search ................................. 362/495, 521, 362/5.22, 545, 496, 520, 548, 549, 331, 332

(56) References Cited

U.S. PATENT DOCUMENTS

| | | | | |
|---|---|---|---|---|
| 1,138,984 A | * | 5/1915 | Shaal | 362/495 |
| 1,296,482 A | * | 3/1919 | Conrad | 362/495 |
| 1,506,022 A | * | 8/1924 | MacFarlane | 362/495 |
| 1,569,867 A | * | 1/1926 | Lindsay | 362/495 |
| 2,264,109 A | * | 11/1941 | Bridge | 362/495 |
| 3,800,138 A | | 3/1974 | Shadwick | 362/334 |
| 4,951,179 A | * | 8/1990 | Machida | 362/545 |
| 4,961,622 A | | 10/1990 | Gorman et al. | 385/33 |
| RE34,275 E | * | 6/1993 | Ramsey | 362/495 |
| 5,287,101 A | * | 2/1994 | Serizawa | 362/331 |
| 5,363,470 A | | 11/1994 | Wortman | 385/147 |
| 5,444,606 A | | 8/1995 | Barnes et al. | 362/340 |
| D367,337 S | | 2/1996 | Barnes et al. | D26/134 |
| 5,658,072 A | * | 8/1997 | Natsume et al. | 362/331 |
| 6,190,027 B1 | * | 2/2001 | Lekson | 362/495 |
| 6,231,221 B1 | * | 5/2001 | Godbillon et al. | 362/521 |
| 6,340,239 B1 | * | 1/2002 | Godbillon et al. | 362/521 |

FOREIGN PATENT DOCUMENTS

| EP | 0531184 B1 | 8/1992 |
|---|---|---|
| EP | 0648642 A1 | 10/1994 |

* cited by examiner

*Primary Examiner*—Alan Cariaso
(74) *Attorney, Agent, or Firm*—McDonnell Boehnen Hulbert & Berghoff

(57) ABSTRACT

A lighting device for a vehicle running board. The lighting device includes an enclosure and a light source coupling mechanism. A light source is coupled to the light source coupling mechanism. A first lens has a plurality of optical elements. The first lens is coupled to the lighting device enclosure. A second lens having optical elements may be provided. Light emanating from the light source is directed by the plurality of optical elements and substantially along the vehicle running board.

14 Claims, 12 Drawing Sheets

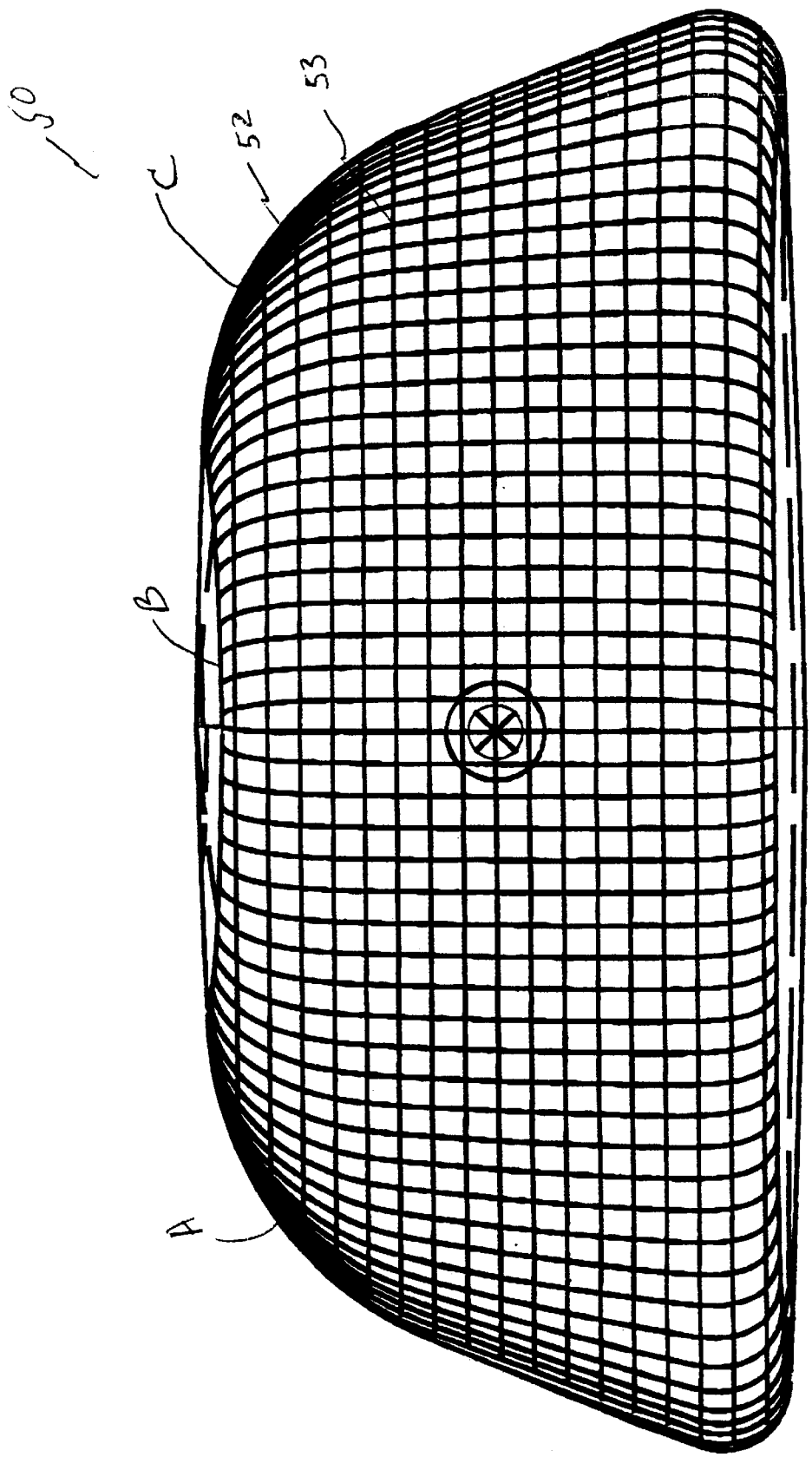

RUNNING BOARD LIGHTING DEVICE

TECHNICAL FIELD

The invention relates to the art of exterior vehicle lighting. In particular, the invention relates to a method and apparatus for illuminating vehicle running boards and/or illuminating areas adjacent a vehicle.

BACKGROUND OF THE INVENTION

The provision of devices for illumination of automobiles is generally known. For example, it is generally known to place lighting devices for illuminating the interior of an automobile. It is also generally known to utilize lighting devices to illuminate areas immediately adjacent the automobile. An example of such a lighting device is a lamp placed on the inside of a door wherein such a lamp is activated to illuminate the area beneath the door when the door is open.

Another example of a known lighting device includes an elongated lighting strip placed on a plate extending upward from a running board step. The lighting strip in this example comprises a hollow tubular element having a plurality of individual light bulbs in a cavity. Other running board lighting systems attach discrete lighting elements to various parts of the running board or to separate elements that are attached to the running board.

One such known running board light assembly is disclosed in U.S. Pat. No. 5,915,830 assigned to Algonquin Industries International, Inc. which is herein incorporated by reference and to which the reader is directed for further details. One disadvantage of this known running board lamp is that it requires a long lighting device, such as a tube, running the entire length of the running board. Therefore, this known device does not utilize a single incandescent bulb to illuminate the entire running board and adjacent area. In addition, this known device does not utilize a compact lens package located in a central location of the running board to illuminate the entire running board and adjacent area. Moreover, such a known device also cannot utilize the advantages of using a light emitting diode as a potential light source.

Such known running board lamps present a number of other disadvantages. For example, some other types of running board lighting devices fail to provide uniform running board surface illumination. Another general disadvantage with certain running board devices having two incandescent lamps at either end of a running board is that they create a certain amount of glare. Another disadvantage is the aesthetically unappealing nature of certain devices while they are emitting light or not emitting light at all. This may be generally true since, for ease of manufacturing and for cost efficiency, certain known running board devices do not include back paint, extra inserts, or any type of bulb shielding device.

However, devices that do include back paint, extra inserts, and bulb shielding have their own disadvantages. For example, back painting involves an extra manufacturing process, resulting in longer production runs and increased cost for paint and the painting process.

The inclusion of extra lighting device inserts or added bulb shields increase the complexity of the manufacturing process by adding additional manufacturing and/or assembly steps. Again, increasing the complexity of the manufacturing process generally results in higher production costs and -generally longer production runs.

Devices utilizing multiple bulb and/or multiple reflector configurations have the disadvantage of generating an excess amount of light and therefore may generate stray light and consequently undesired glare or reflections. Such unwanted light decreases the overall efficiency of such lighting devices. Moreover, multiple bulb lamps tend to create an excess amount of heat and may therefore tend to be larger in size in order to dissipate excess heat. Multiple bulb lamps also increase the design and manufacturing burden associated with such lamps.

Other devices may include a heat or a bulb shield in front of the lens or include an additional insert in front of the bulb. A bulb shield may be added to block direct light emanating from the bulb causing glare. A heat shield may be utilized to eliminate certain thermal problems (i.e., melting or warping of lens) caused by an excess amount of heat generated from the bulb.

There is, therefore, a general need for a running board lighting device that increases uniformity in running board illumination, reduces glare, increases aesthetic appeal, and that can be cost effectively designed and manufactured. There is also a general need for a running board lamp that does not require back painting, extra lighting device inserts, or bulb shields. There is also a general need to reduce the basic need for multiple light sources and therefore the amount of internally generated heat.

SUMMARY OF THE INVENTION

In accordance with one aspect of the present invention, a lighting device for a vehicle running board is provided. The device includes a lighting device enclosure and a light source coupling mechanism. A light source is coupled to the coupling mechanism and a first lens that has a plurality of optical elements. The first lens is coupled to the lighting device enclosure. Light emanating from the light source is directed by the optical elements along the vehicle running board. A second lens having a plurality of optical elements may also be provided.

In accordance with another aspect of the present invention, an exterior mounted vehicle lighting device includes a lighting device enclosure having a light source coupling means. A light source is coupled to the mounting means and a lens is coupled to the lighting device enclosure. A plurality of optical elements direct light emanating from the light source along a vehicle running board.

BRIEF DESCRIPTION OF THE DRAWINGS

FIG. 3B is a front view of the lighting device illustrated in FIG. 3A;

DETAILED DESCRIPTION OF PREFERRED EMBODIMENTS

Figure 1:
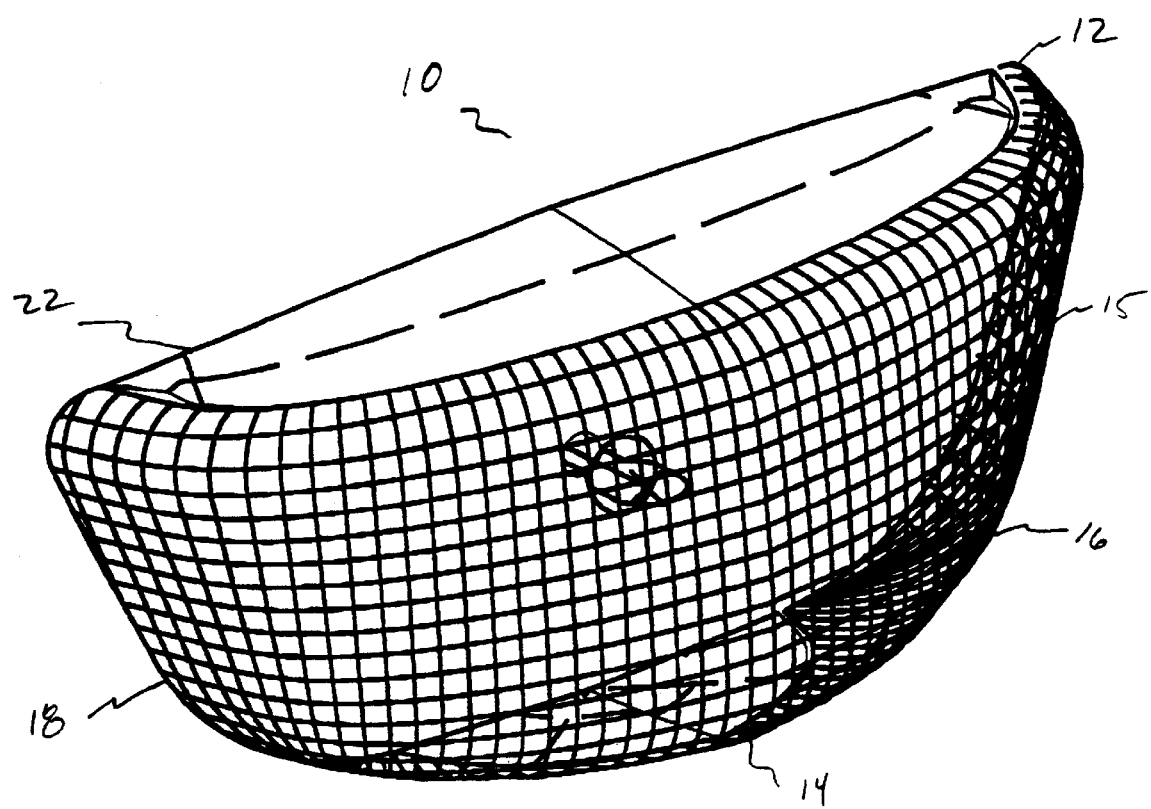
FIG. 1 is a perspective view of a vehicle running board lighting device incorporating an embodiment of the present invention.

FIG. 1 is a perspective view of a vehicle running board lighting device 10. Lighting device 10 contains an internal light source and a lamp housing enclosure 12. The light source may be an incandescent light, a lighting emitting diode, or other similar type of light source.

Enclosure 12 includes a front lens portion 16 and a rear lamp housing portion 22. As can be seen from the device 10, the front lens portion 16 includes various lens optical areas, each optical area containing various optical elements. These lens optical areas are designated generally as areas 14, 15, and 18. As will be discussed in greater detail later in the specification, optical areas 14, 15, 18 include optical elements that distribute light generated from the light source contained within the device enclosure 12. Based on the optical characteristics of the optical elements, optical areas 14, 15, and 18 distribute light in a predetermined pattern over a vehicle running board and/or along or beside a vehicle running board.

Lighting device 10 is preferably molded, formed, or milled plastic or glass substrate. Such substrate may include plastics, such as acrylic, polycarbonate, or glass.

In the device illustrated in FIG. 1, lighting device 10 includes a light source coupled to a back of the lamp housing portion 22. Lamp housing 22 is coupled, preferably sonically welded, to the lens portion 16. As one of ordinary skill in the art will recognize, other coupling means may be used including sonic welding, vibration welding or gluing.

As will be described in further detail below, the lighting device of the present invention includes optical elements. In a first embodiment of the present invention, the lighting device includes a first lens wherein optical elements are disposed on an inner surface of this first lens. In an alternative embodiment, the lighting device includes a primary and secondary lens wherein optical elements are disposed on an exterior surface of the primary lens and on an interior surface of the secondary lens.

Preferably, in either the first or the second embodiment, optical elements have a prismatic configuration. Alternative optical element configurations include lens flutes or pillows. Flutes are provided as elongated cylindrical optics with a specific curvature generally defined by a radius of a sphere. Pillows may be square, rectangular, or diamond-shaped spherical optics with a curvature defined by a radius of a sphere.

Figure 2:
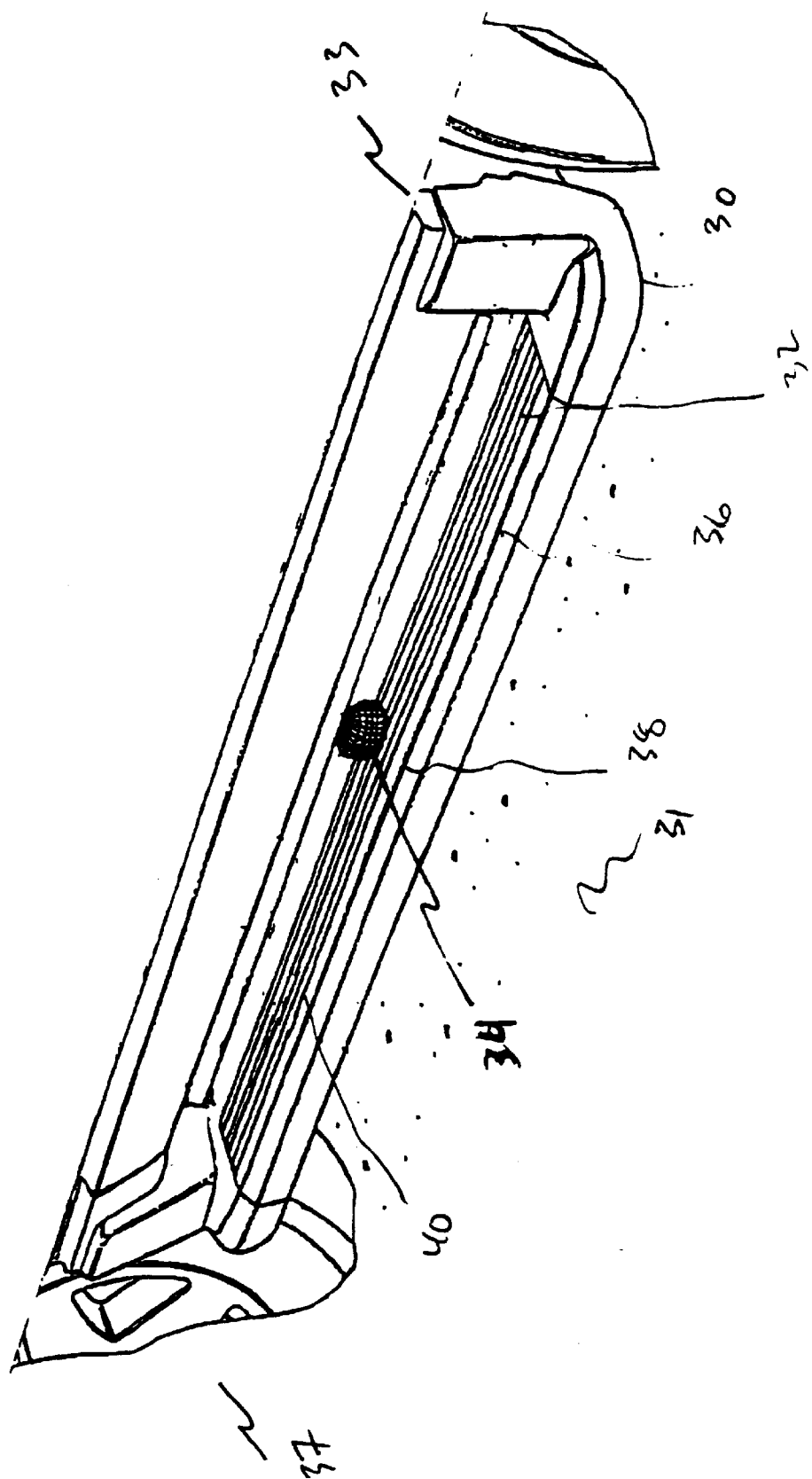
FIG. 2 is a perspective view of the lighting device illustrated in FIG. 1 adjacent a running board.

The lighting device illustrated in FIG. 1 is used for exterior lighting, preferably for the illumination of a vehicle running board and adjacent area. For example, a lighting device 34 incorporating an embodiment of the present invention may reside along a running board 30 as illustrated in FIG. 2. The running board 30 is fixedly attached to a vehicle 37 and positioned generally above the ground 31. As one of ordinary skill in the art will recognize, the vehicle may represent a standard family car, sports utility vehicle, a commercial vehicle or the like.

The running board 30 has an upper surface 32 having various stepping areas 36, 38, and 40. These stepping areas are provided to assist an individual entering or exiting the vehicle 37. Positioned in the manner shown in FIG. 2, lighting device 34 allows light generated by an internal light source to be distributed along the running board stepping surfaces, including areas 36, 38, and 40. Because of the structure and configuration of the optical elements within the lighting device lens, lighting device 10 can direct light where the light is intended to be directed while also limiting undesired glare.

For example, the optical elements may be configured so as to limit emanated light from being transmitted towards an observer approaching the running board. Consequently, such emanated light does not glare or cause a distraction to an approaching observer.

Figure 6:
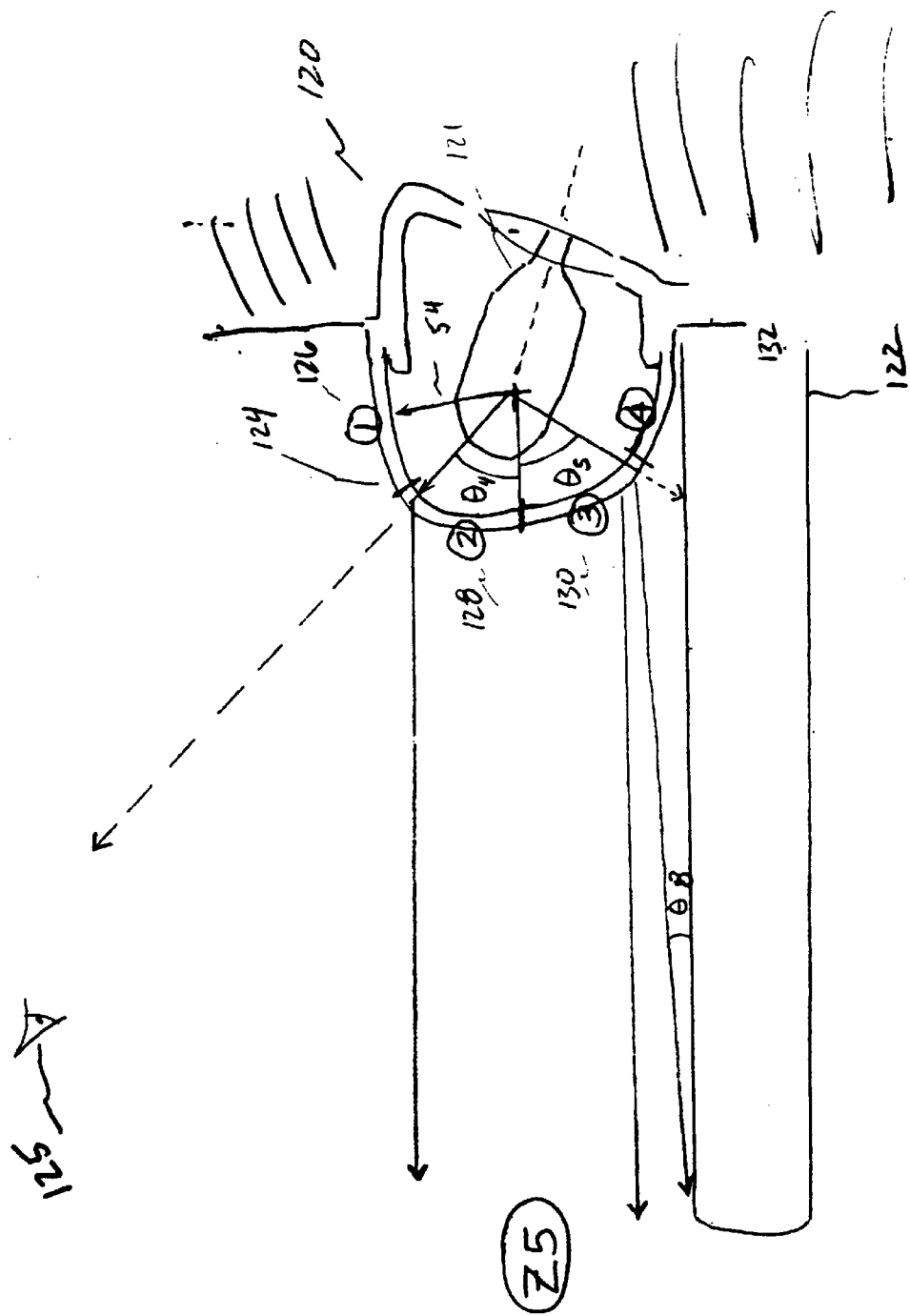
FIG. 6 is a side view of a light distribution pattern of the lighting device shown in FIG. 2.
Figure 7:
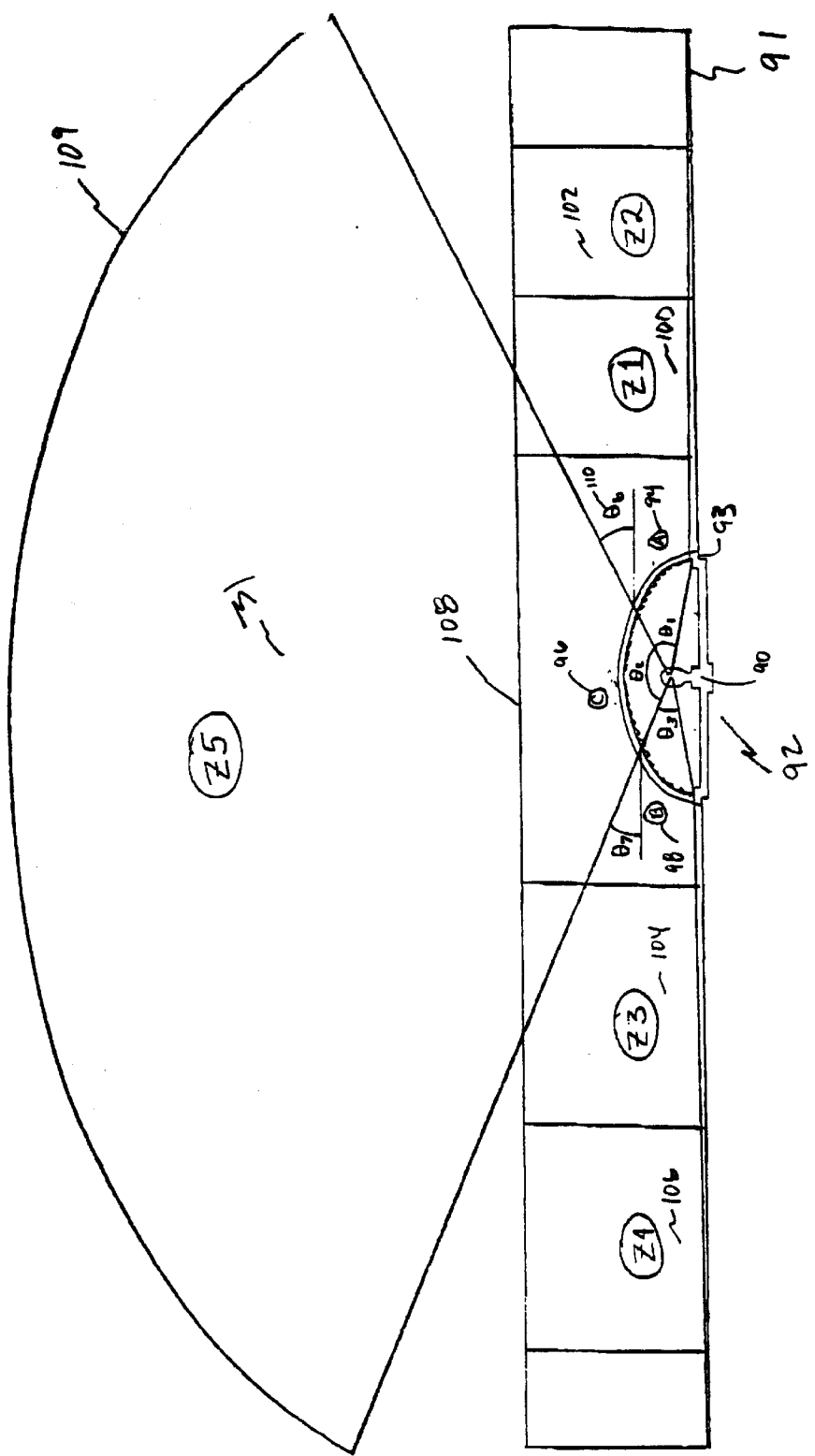
FIG. 7 is a top view of a light distribution pattern of the lighting device shown in FIG. 2.

As illustrated in FIGS. 6 and 7, the bulb or light source within the lamp typically emits light in all directions emanating outward from the bulb. As a result, without optic elements redirecting this light, some of the emitted light rays will travel from the light source, through the lens, to the eye of the observer as the observer approaches the vehicle. The eye of the observer will typically be above the level of the running board lamp. Additionally, an observer will typically approach the vehicle from the side. The optic elements redirect the light rays "away" from the eye of this oncoming observer by bending the light down in a different direction. Preferably, the light is bent or redirected by the lens optic elements.

Additionally, the lighting device 34 illuminates the ground 31, alongside the running board 30. In this manner, an individual attempting to enter the vehicle 37 or attempting to step onto or near the running board surface 32 may identify obstructions or hindrances (e.g., rain, puddles, snow, etc.) that may obstruct or hinder entering the vehicle and/or stepping onto the running board.

Figure 3A:
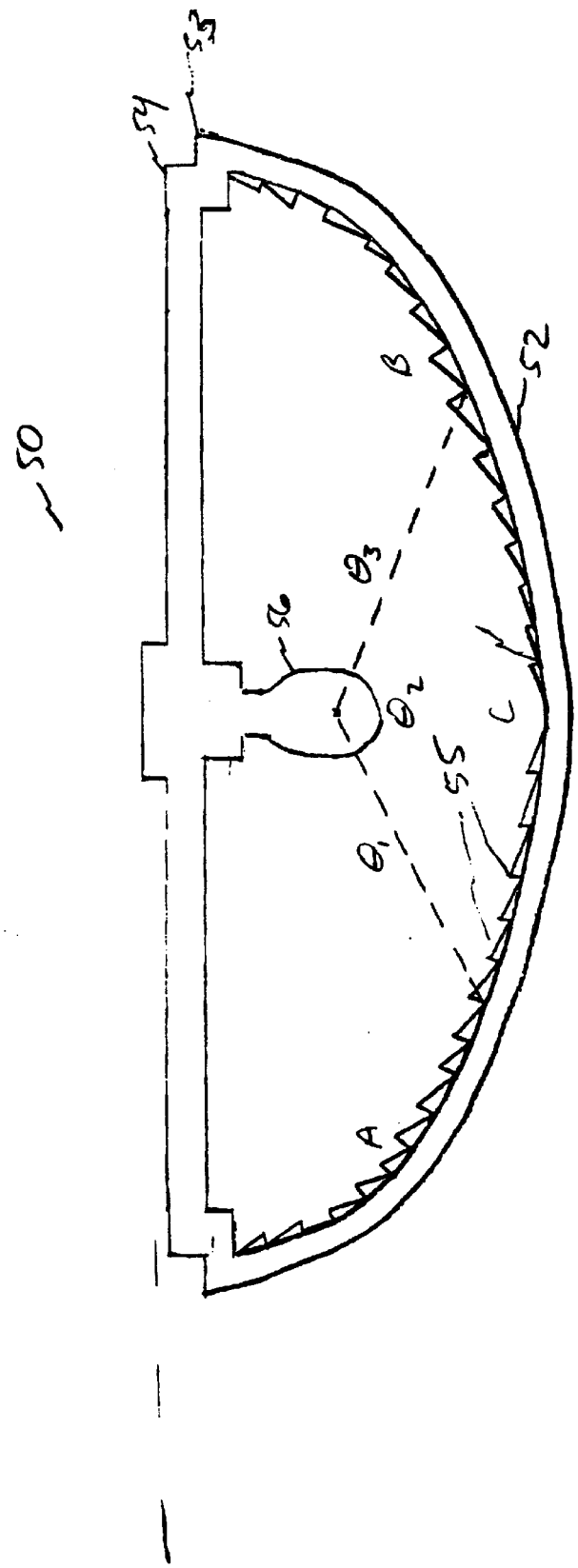
FIG. 3A is a top view of a first embodiment of the lighting device illustrated in FIG. 2.

FIG. 3A illustrates a top view of a first embodiment of a lighting device 50 in accordance with one aspect of the present invention. And FIG. 3B illustrates a top view and FIG. 3C a side vie of the first embodiment of the lighting device 50 illustrated in FIG. 3A.

Figure 3C:
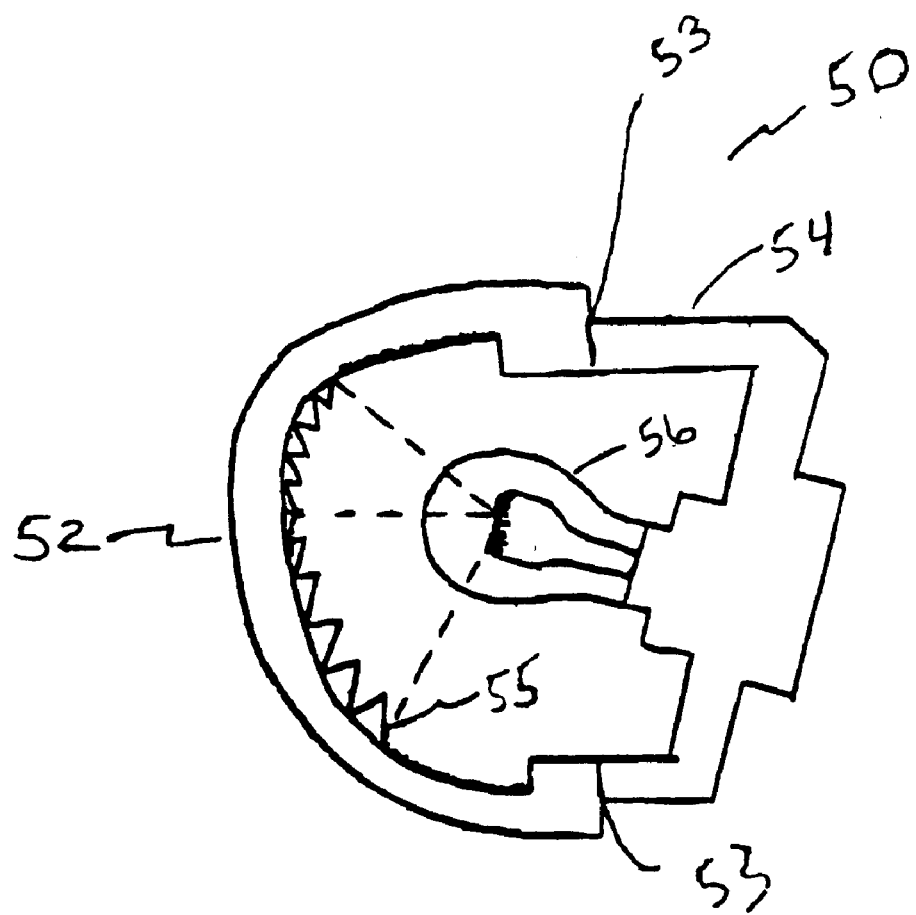
FIG. 3C is a side view of the lighting device illustrated in FIG. 3A.

Referring now to FIGS. 3A, 3B, and 3C, the lighting device 50 includes a lens 52, a lens mounting portion 54, and a light source 56. As shown, optical elements 55 are provided on an interior surface of lens 52. The lens may be defined as having three light distribution areas defined by θ1, θ2, and θ3. These three light distribution areas are shown as areas A, B, and C in FIG. 3A.

A lens 52 is mounted to a front portion 53 of the lens mounting portion 54. The lens 52 could have various types of optical characteristics including either transmissive or refractive optical characteristics. In this first embodiment, the lens 52 has an interior surface and optical elements 55 reside on the interior surface of lens 52.

Figure 4:
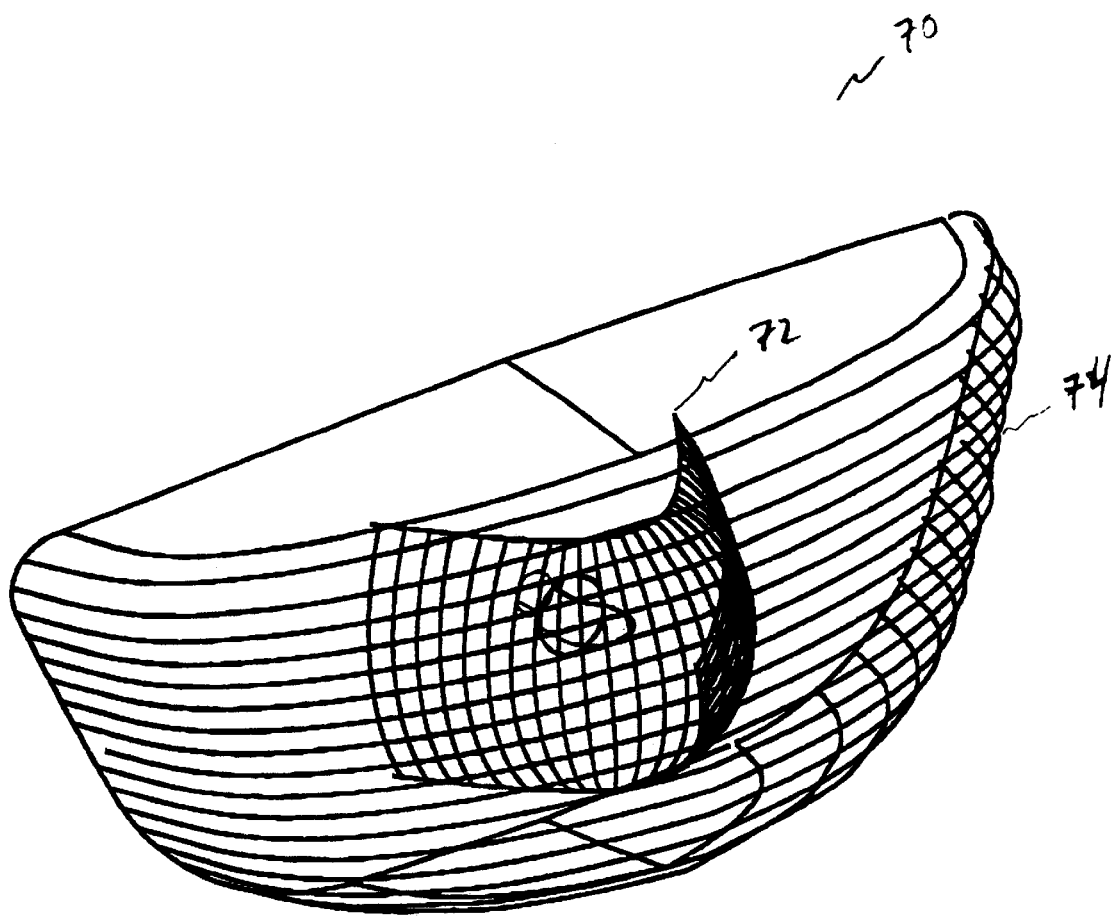
FIG. 4 is a perspective view of a vehicle running board lighting device incorporating an alternative embodiment of the present invention.
Figure 5A:
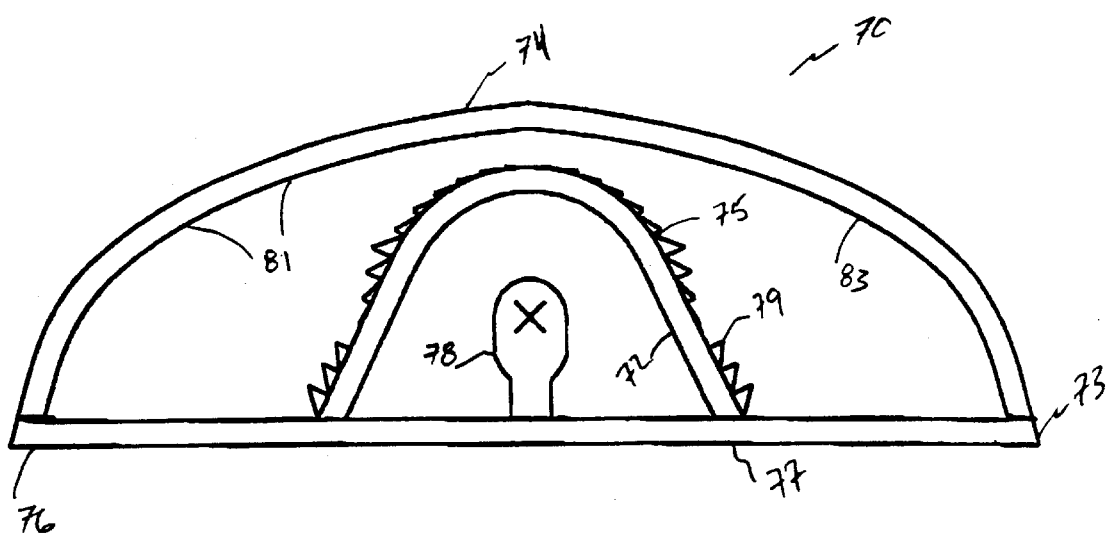
FIG. 5A is a top view of a second embodiment of the lighting device illustrated in FIG. 2.
Figure 5B:
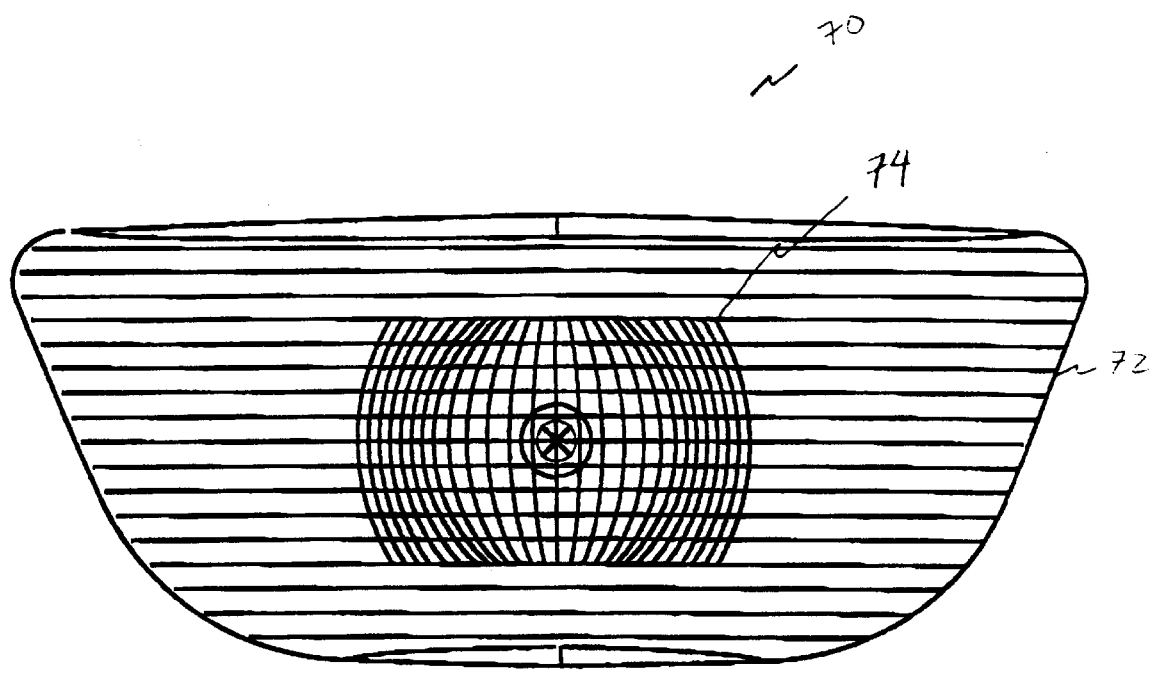
FIG. 5B is a front view of the lighting device illustrated in FIG. 5A.
Figure 5C:
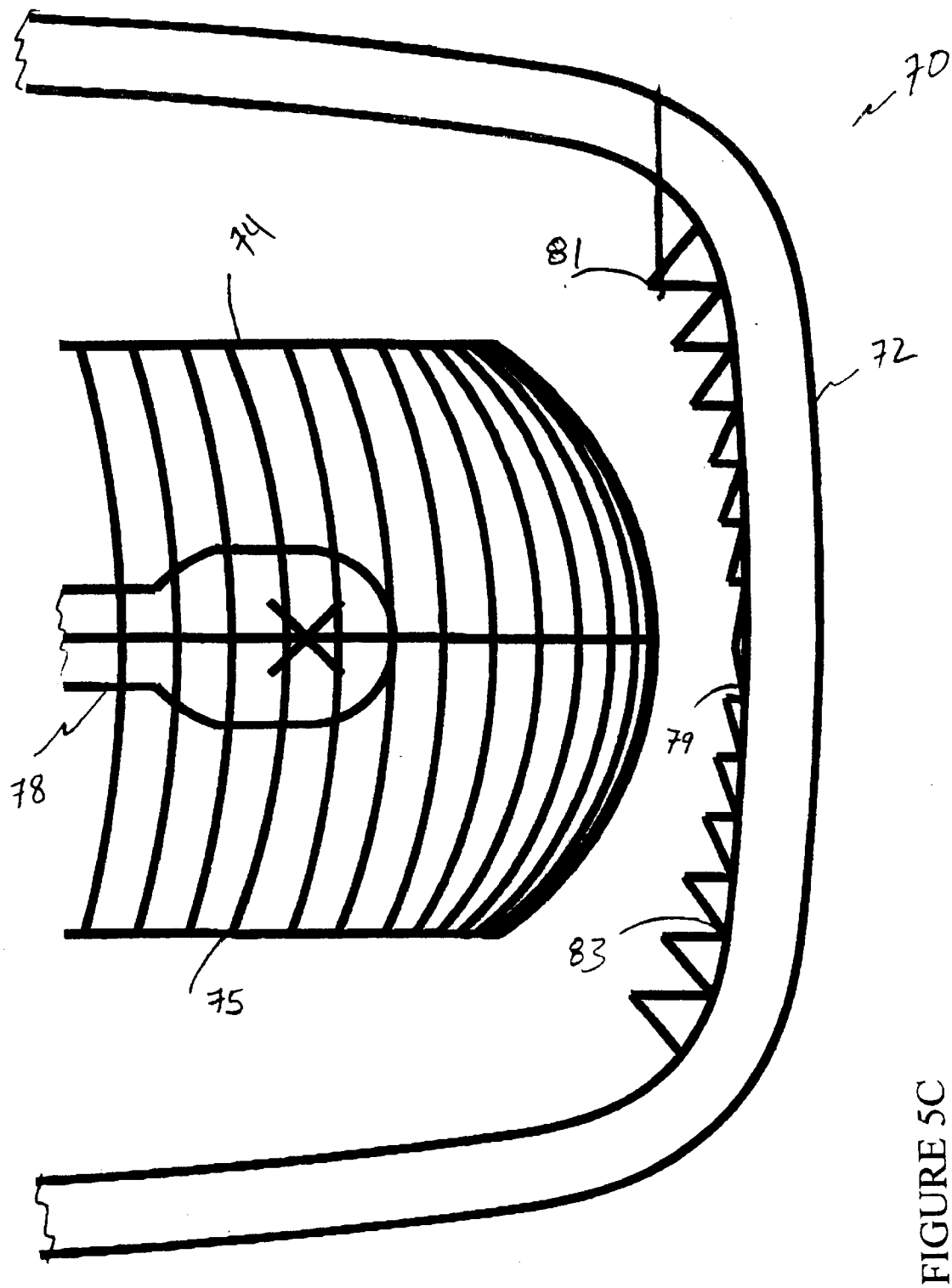
FIG. 5C is a side view of the lighting device illustrated in FIG. 5A.

In an alternative embodiment, the lighting device comprises a first and a second lens and optical elements reside on both the first and the second lens of the lighting device. For example, FIG. 4 is a perspective view of a vehicle running board lighting device incorporating an alternative embodiment of the present invention. FIG. 5a illustrates a top view of an alternative embodiment of a lighting device 70. And FIG. 5B illustrates a front view and FIG. 5C illustrates a side view of the alternative embodiment illustrated in FIG. 5A.

Referring now to FIGS. 4 and 5A through C, lighting device 70 includes a secondary lens 74, a primary lens 72, a lens mounting portion 76, and a light source 78. Primary lens 72 is coupled to a first portion 73 of the lens mounting portion 76. Secondary lens 74 is coupled to a second portion 77 of the lens portion 76.

In this second embodiment, the primary lens 72 has an interior surface 75 and optical elements 79 reside on this lens surface. The secondary lens 74 has optical elements 81 residing on an exterior surface 83 of the lens 74. Preferably, the optical elements 81 on the exterior surface 83 of the lens 74 are vertical elongated wedges and the optical elements 79 on the interior surface 75 of the lens 72 are horizontal elongated wedges. FIG. 5B shows a front view of the lighting device illustrated in FIG. 5A and FIG. 5C shows a side view of the lighting device illustrated in FIG. 5A.

With respect to the lighting device illustrated in FIG. 5A, the secondary lens 74 may include two types of optical elements: horizontal and vertical optical elements. Both optical elements are elongated wedges whose surface angles may differ. These optical elements may be 2 millimeter in height and 2 millimeter in width but other sized elements may be used as well.

The secondary lens may be a free form shape. In other words, the lens need not have any specific, predefined curvature, such as spherical, elliptical, or parabolic in shape. Rather, the outer lens curvature may be defined by a complex curve. A complex curvature may be defined by a customer's needs based on styling preference and packaging constraints for a specific vehicle application.

As will be discussed in greater detail with reference to FIG. 6, the lighting source illustrated in FIG. 2 is preferably mounted at an angle to a horizontal (i.e., the horizontal may be the running board surface 32 or the ground 31 illustrated in FIG. 2). This can be seen by reference to FIGS. 3C and 5C.

Preferably, the lighting device has a light source that is mounted at a certain angle to the running board surface. The light source may be mounted at an angle preferably ranging from 45° to 90° as measured from the running board surface. However, the actual angle is dependent on the specific package of the lamp, and may vary from application to application and is generally determined by packaging constraints of a particular vehicle. The mounting position may also vary based on the type of light source used.

FIG. 7 illustrates a top view of a light distribution pattern of the lighting device illustrated in FIG. 1. Lighting device 92 is shown mounted adjacent a running board 91 which is mounted alongside a vehicle and above the ground, such as the running board 30 illustrated in FIG. 2. In FIG. 7, the lighting device includes a light source 90 mounted within the lighting device as previously described with reference to FIGS. 3 A, B, and C and FIGS. 5A, B, and C.

Light source 90 is enclosed by the device 92. Device 92 may be a single lens structure as shown in FIG. 3A or may be a double lens structure as shown in FIG. 5A.

Lighting device 92 is shown as having three light distribution surface areas, area A, B, and C, designated by element numbers 94, 98, and 96 respectively. These light distribution surface areas distribute light generated by light source 90 to various portions of the running board 91 and surrounding area.

Light source 90 generates and distributes light to generally five different light distribution zones, Z1 100, Z2 102, Z3 104, Z4 106, and Z5 109. Light source 90 has a lens and the lens may be separated into basically three light distributing areas: Area A, Area B, and Area C. The optical elements of lighting device lens areas A, B, and C are configured such that a specific distribution of light is accomplished.

Lens area A 94 distributes light to step zone areas Z1 100 and Z2 102. Lens area B 98 distributes light to step zone areas Z3 104 and Z4 106. Lens area C 96 distributes light to, step zone area Z5 109.

Light transmitted from the light source 90 propagates through the optic elements of lens 92 and is redirected towards the step zone areas. Additionally, light generated by the light source is redirected by the optic elements to reduce glare light into an approaching observer's eye.

As shown in FIG. 7, lens Area A 94 relates to a first side of the lens. A light ray emitted by light source 90 and incident upon lens Area A 94 is deflected toward running board zones Z1 100 and Z2 102. Angle $\theta_6$ 110 defines lens Area A 94 and is generally defined by the geometry of the lens 92 with respect to a filament location of the light source 90 and is limited by a die draw line angle. As those skilled in the art will recognize, the draw line angle effects the angle at which the optical elements or wedge flutes may be created.

Adjacent to lens Area A 94 is lens Area C 96. Lens Area C 96 defines a center portion of the lens 92. (see FIGS. 3B and 5B). Light rays incident on lens Area C 96 are redirected towards a front portion of the running board 108 and the ground area 31 adjacent the running board 30 which can be generally referred to as stepping Zone Z5 109. Zone Z5 109 includes a center portion of the running board and also includes the ground immediately in front of the running board 30. The light rays redirected by lens Area C 96 are directed away from the upward angles that cause glare to a viewer's eye. The light rays are also directed away from the downward angles that may cause certain hot spots on running board surface 30. The resulting light distribution pattern of the light distributed via lens Area C 96 may be explained with reference to the illustration provided in FIG. 6.

FIG. 6 illustrates a side view of a light distribution pattern of the lighting device 10 illustrated in FIG. 1. Specifically, FIG. 6 provides a cross section light distribution pattern of lens Area C 96 of FIG. 7.

FIG. 6 includes a running board lighting device 120 residing adjacent running board 122. Lighting device 120 has an outer lens surface 124 that may be partitioned into a first lens surface area 126, a second lens surface area 128, a third lens surface area 130, and a fourth lens surface area 132. First area 126 resides along a top of the lens and light incident along lens surface area 126 does not contribute to the overall beam pattern generated by device 50. Optical elements, therefore, are preferably not disposed on this particular lens portion due to various manufacturing issues, including die lock tooling conditions, or customer styling preferences.

Alternatively, lens surface areas 126 and 132 may be painted. For example, painting these lens surface areas could be done during the manufacturing process. The decision whether or not to paint these areas would be made by the customer based on styling preference. Alternatively, the lens surface areas could contain decorative optics, having a textured or frosted appearance.

The center, top lens portion is designated as a second lens area 128. Light incident on second lens area 128 is redirected outward and is directed generally parallel to the running board (and also parallel to the ground residing underneath the running board). Referring to FIG. 7, this illuminated area is designated as light distribution Zone 5.

Second lens portion 128 may be defined by an angle $\theta_4$ and is generally defined by the geometry of the overall lens structure and also with respect to a light device filament location and is limited by the die draw angle.

Third lens area 130 defines the center bottom portion of the front of the lens. A light ray incident on this area is deflected outward parallel to the running board 122 and bent upward to the end of the running board away from a hot spot directly under the device 120 (i.e., hot spot reduction) to Zone Z5 (See FIG. 7). Third lens portion 130 may be defined by angle $\theta_5$ and, similar to angle $\theta_4$, is defined by the geometry of the lens with respect to the filament location and is limited by the die draw angle of the lens.

Fourth lens area 132 defines a bottom portion of the lens 126. Light rays emitted from light source 121 and incident on the fourth lens area 132 do not contribute to the overall beam pattern generated by lighting device 120. Therefore, fourth lens area 132 defines a non-functional lens area. Preferably, optic elements are not disposed on fourth lens area 132 due to the previous mentioned die lock tooling conditions. Therefore, fourth lens area may be painted or configured with decorative optics. In addition to painting or decorating optics being used in this non-functional lens area, the non-functional lens area could have textured or frosted surface appearances. This general discussion also applies to lens area 126.

As can be seen from FIG. 7, a large portion of the light generated by the light source is deflected horizontally to illuminate the general area in front of the lamp and s therefore along and in front of the running board. The horizontal spread or the amount of illumination area in front of the running board 91 is a function of the geometry of the running board 91 with respect to the position of the device 92 on the running board 91. For example, angles $\theta_6$ 110 and $\theta_7$ 112 are preferably defined by measuring the angle from an edge of lens Area C 96 to an outermost edge of the running board 30. In a preferred embodiment, angles $\theta_6$ and $\theta_7$ range from 4° to 15°. However, this range will vary based on specific applications.

Light incident on lens Area B 98 is directed towards running board step Zones Z3 104 and Z4 106 of running board 30. As previously discussed, angle $\theta_3$ may be defined by the geometry of lens 92 with respect to the filament location and may be limited by the die draw angle. In a symmetrical lens geometry, $\theta_1$ will be generally equal to $\theta_3$ (See FIGS. 3 and 5).

As previously discussed with respect to FIGS. 3A, B, and C, in a first embodiment of the present invention, optical elements are provided on an inner surface of the lens. In a second embodiment, the lighting device is provided with a primary lens and a secondary lens where optical elements are provided on an exterior surface of secondary lens and on an interior surface of primary lens (See FIGS. 5A, B, and C). These optical elements are commonly referred to as prismatic optics, prismatic step optics, wedge optics, chiseled optics, or prismatic elements.

Because the light distributed by lens areas A, B, and C differ, the optics of lens area C and lens areas A and B are not identical. For example, the optics directing light onto the running board and the optics located in the front of the bulb direct light at the angle at which the optics are designed to bend or redirect light from the filament or light source.

In a symmetrical configuration, the optics on lens area A will be symmetrically opposite to the optics on lens area B. If the lamp is not positioned exactly in the center of the running board, or if the step zones areas are of different size, the optical elements may have different angular designs (i.e., they may not be symmetrical).

The optical elements of lens areas 2C and 3C are designed so that they direct light from the light source by bending the light so that the light is horizontally collimated outward from the lamp (located approximately 1 to 3 feet above the ground) parallel to the ground. Lens area A and lens area B redirect light to the step zones Z4, Z3, Z1, Z2.

Preferably, the optical elements may be grouped into 2×2 millimeter square optical prisms along a surface of a lens. For example, the optical elements disposed on the lens surface of the lighting device illustrated in FIG. 3A may be 2×2 square elements. These elements may be created larger or smaller in size.

Figure 8:
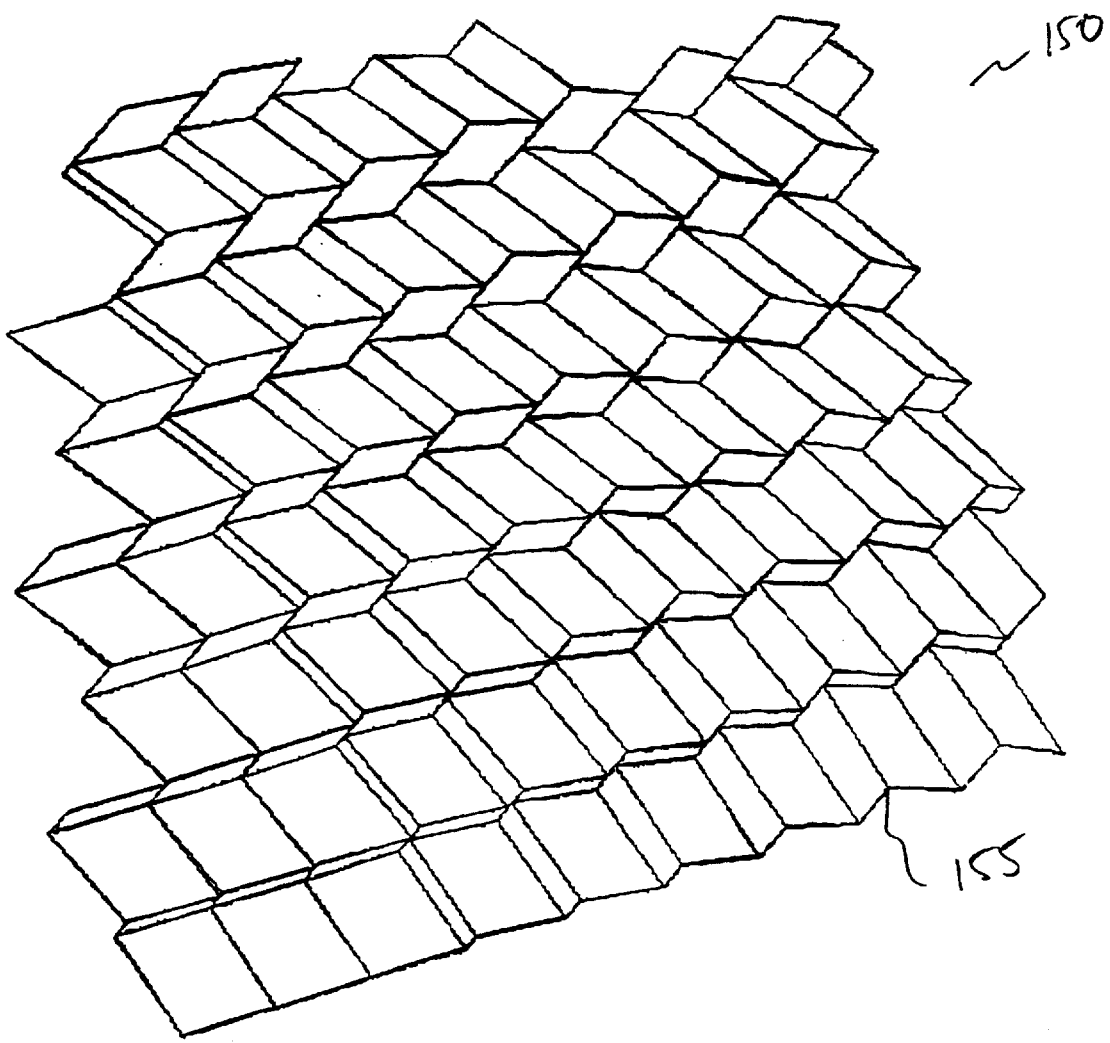
FIG. 8 is a perspective view of an array of optical elements provided on a lens surface of the lighting device illustrated in FIG. 1.

FIG. 8 is a perspective view of an array of optical elements 150 of the lighting device illustrated in FIG. 1. In this perspective view, the optical elements 150 are prismatic in structure and may reside on a lens inner or outer surface, preferably on the inner surface. Preferably, these prismatic optical elements are 2×2 mm in size. Each optical element is designed with two specific refraction angles wherein the two refraction angles are not necessarily equal. The refraction angles maybe used to create the edges of the prismatic element surface.

Those skilled in the art to which the invention pertains may make modifications and other embodiments employing the principles of this invention without departing from its spirit and essential characteristics, particularly considering the foregoing teachings. Accordingly, the described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials, and the like would be apparent to those skilled in the art, yet would fall within the scope of the invention.

We claim:

1. A lighting device comprising:
   a lighting device enclosure residing adjacent a vehicle running board;
   a light source coupling mechanism provided by the lighting device enclosure;
   a light source coupled to the light source coupling mechanism; and
   a first lens having a plurality of optical elements, said first lens coupled to the lighting device enclosure, and
   a second lens having a plurality of optical elements coupled to the coupling mechanism and substantially enclosing the first lens;
   such that light emanating from the light source is directed by the plurality of optical elements of the second lens.

2. The invention of claim 1 wherein the plurality of optical elements reside on an interior surface of the first lens.

3. The invention of claim 1 wherein the light source is an incandescent light bulb.

4. The invention of claim 1 wherein the light source is a light emitting diode.

5. The invention of claim 1 wherein the optical elements of the first lens are a plurality of square optical elements.

6. The invention of claim 1 wherein the optical elements of the first lens are a plurality of horizontal optical elements that distribute light vertically outward away from the light source.

7. The invention of claim 1 wherein the optical elements of the second lens are vertical optical elements.

8. An exterior mounted vehicle lighting device comprising:

a lighting device enclosure having a light source coupling means and residing adjacent a running board of a vehicle;

a light source coupled to the light source coupling means;

a primary lens coupled to the lighting device enclosure;

a first plurality of optical elements provided on the primary lens;

a secondary lens coupled to the lighting device enclosure; and a second plurality of optical elements provided on the secondary lens, such that the second plurality of optical elements direct light emanating from the light source at least along the running board of the vehicle.

9. The invention of claim 8 wherein the first plurality of optical elements are disposed on an exterior surface of the primary lens.

10. The invention of claim 8 wherein the light source is an incandescent light bulb.

11. The invention of claim 8 further comprising a plurality of horizontal optical elements disposed on the primary lens such that the plurality of horizontal elements vertically deflect light emanating from the light source outward away from the light source.

12. The invention of claim 11 wherein the first plurality of optical elements are square optical prisms.

13. The invention of claim 11 wherein the plurality of horizontal optical elements are generally located on the interior surface of the primary lens.

14. The invention of claim 11 wherein the plurality of horizontal optical elements are approximately 2 millimeters in width.

* * * * *